June 16, 1942.   G. A. VAUGHN   2,286,699
SCRAPER
Filed Jan. 27, 1941
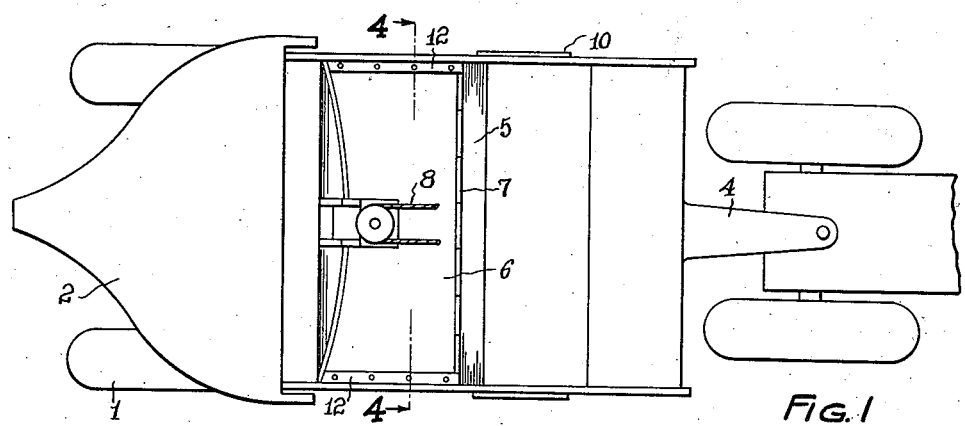
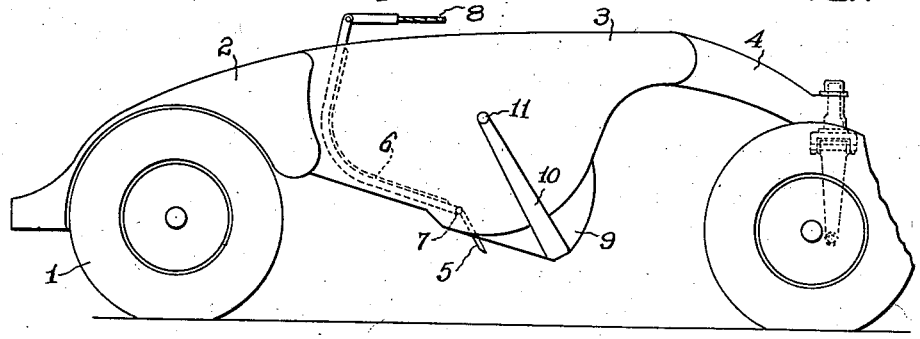
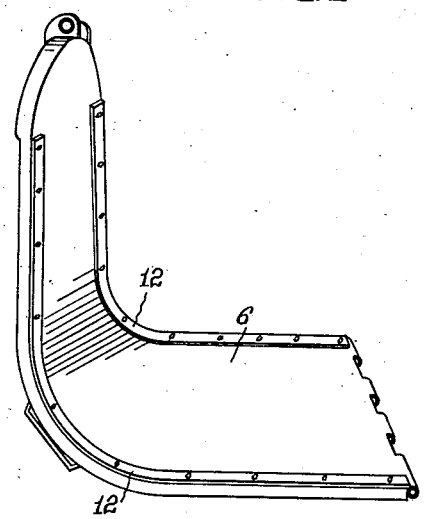
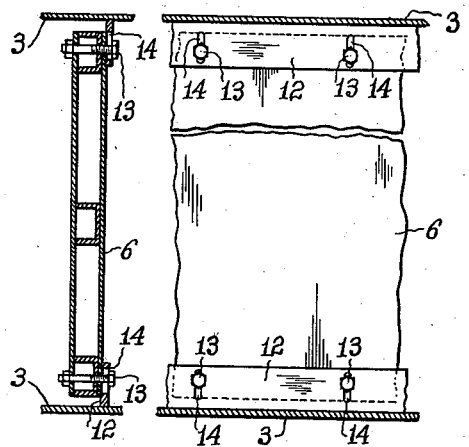
INVENTOR:
GEORGE A. VAUGHN
BY
ATTORNEYS.

Patented June 16, 1942

2,286,699

UNITED STATES PATENT OFFICE 2,286,699

SCRAPER

George A. Vaughn, Newton, Iowa, assignor to Koehring Company, Milwaukee, Wis.

Application January 27, 1941, Serial No. 376,216

3 Claims. (Cl. 37—124)

The present improvements appertain to the art of wheeled or power scrapers of the type primarily involving a scraping vehicle structure. In constructions of scrapers of this class, there is usually employed a vehicle comprising at least supporting rear wheels, a scraper body composed of a frame mounted upon said wheels and including sides between which the dirt or earth is received in the scraping operation, and draft means at the front end of the body to be mounted upon a tractor or supported by forward wheels so as to enable the vehicle to be drawn forward in its scraping and dirt carrying travel movements.

In the type of machine improved upon hereby, the scraping blade proper is secured to the sides of the body and adapted to be raised and lowered therewith, when lowered assuming its scraping position, and when raised with the body being in nonoperating position as when the body is traveling with its load to be carried to the place of deposit.

Additionally, in the present type of scraper vehicle, referred to, it is contemplated to provide between the sides of the body a rear load receiving and carrying apron. This apron is mounted pivotally in rear of the scraper blade and movable upwardly and downwardly between the sides. In its lowered position, the said apron is capable of supporting a very tangible portion of the load of material scraped into the vehicle body during the forward movement of the vehicle and when the scraper has reached the place where the load is to be deposited or gradually ejected from the body, the said apron is elevated by suitable means for the purpose of emptying the portion of the load carried thereby from the vehicle.

The present invention relates essentially to the rear apron construction above referred to, though it is adaptable to the construction of a front apron working in a somewhat similar manner and capable of carrying also a portion of the load in certain types of these scraper vehicles. Necessarily, the side edges of the apron above mentioned are designed to work in close proximity or contact with the sides of the vehicle to prevent the dirt or earth received on the apron from escaping from the vehicle body. In use, stones or other foreign material often lodge between the inner sides of the vehicle and the side edges of the apron and a very considerable amount of abrasion is caused between these portions of the body and apron wear on the latter and causing spaces to be created between the apron and the side walls of said body.

The improvements hereof involve the employment of adjustable scraper plates which are attached to the side edge portions of the apron in the plane of the body thereof and conforming with the curvature of said apron, said plates being susceptible of being adjustable outwardly and toward the inner surfaces of the sides of the body whereby to take up wear and whereby to further efficiently scrape dirt or like material from the said surfaces of the body sides, as will be more fully apparent upon reference to the following specification and to the accompanying drawing, in which:

Figure 1 is a general top plan view somewhat diagrammatic in its illustration of a known type of scraper having the invention applied thereto.

Figure 2 is a side elevation of the same.

Figure 3 is a perspective view of the apron alone bringing out more clearly the mounting of the scraper plates at its side edges.

Figure 4 is a sectional view taken about on the line 4—4 of Figure 1.

Figure 5 is an enlarged fragmentary plan view bringing out more clearly the mounting of the scraper plates upon the apron structure and the coaction between the scraper plates and the inner surfaces of the sides of the body.

Describing the invention in detail, the scraper vehicle illustrated in the drawing is of the general type embodied in the application for patent of George A. Vaughn, Serial No. 329,531, filed April 13, 1940. Said scraper vehicle comprises the rear wheels 1, a suitable body 2 including the sides 3, a draft member 4 at the front end of the body for supporting the same upon a traction vehicle by which the scraper vehicle is propelled forwardly in its scraping operation and general travel operation.

Suitable means, not illustrated since the same are not of any importance to the invention, are employed for raising and lowering the body of the vehicle, so that the scraper blade 5, which is attached in a substantial way to the lower portions of the sides 3, may be raised and lowered. When the body structure is lowered, the blade 5 assumes a scraping position in relation to the earth over which the vehicle is being drawn and becomes operative for its scraping purposes. When the body structure is raised, in which position it is illustrated in Figure 2, the scraper blade 5 is inoperative and the vehicle will be employed for travel primarily to carry its load previously received to a place of deposit or spreading, or when the body is so disposed the vehicle may be empty and traveling to a point where it will be employed again for the scraping operation with blade 5 down.

Between the sides 3 of the body is arranged the load receiving and carrying apron 6 which is pivoted at 7 by a suitable hinge or pintle member connecting the lower front edge of the apron to the sides 3. By the operation of a suitable windlass, not shown but connected to a cable 8, the apron 6 may be raised from the position shown in Figure 2 in order to empty the load therefrom through the space between the sides 3 and a front apron 9 that is carried by the sides 3 in advance of the blade 5 and the apron 6. The front apron 9 is supported by the side arms 10 pivoted at 11 to the sides 3 and the operating mechanism for the front apron is not shown. Indeed, the front apron 9 may not be used though in the type of vehicle illustrated it is employed.

As shown best in Figures 3, 4 and 5, the apron 6 is equipped at its side edges with scraper plates 12 of like construction, the same being curved to conform with the curvature of the apron 6. The plates 12 are attached to the apron by means of suitable bolts 13 and said plates 12 have their outer edges so disposed as to be in fairly close contact with the inner surfaces of the sides 3 of the vehicle body. To permit adjustment outwardly of the scraper plates 12 in order to compensate for wear on their outer edges, the plates 12 are provided with transverse slots 14 through which the fastenings 13 pass.

By reason of the foregoing construction, it will be apparent that by simply loosening the bolts 13, the plates 12 may be moved outwardly to adjust them in close contact with the sides 3 after the plates have become worn. Likewise, the plates 12 form efficient scraping members that may be entirely removed and replaced after becoming unduly worn or injured by the action of the scraping operation of the vehicle under severe conditions of use.

As previously intimated, where an apron similar to the apron 6 is mounted between the sides 13 of the vehicle and designed to act as a front scraper mounted in a position somewhat reverse to that of the apron 6, such a front apron may be equipped with plates 12 like those above described, and the same will be equally serviceable for the purposes mentioned.

Having thus described my invention, what I claim as new and desire to secure by Letters Patent of the United States, is:

1. In a scraper vehicle of the class described, in combination, a body composed of spaced sides, a dirt receiving and supporting apron pivotally mounted between the sides of the vehicle with its edges arranged adjacent to the inner surfaces of said sides, a scraper blade associated with the scraper body adjacent to the receiving edge portion of the apron, and scraper plates whose surfaces are parallel with the surface of the apron detachably mounted upon the side edges of the apron and having their outer edges disposed in close relation to the inner surfaces of said sides.

2. A scraper vehicle as claimed in claim 1, combined with adjustable fastening means for holding the scraper plates in position at the side edges of the apron whereby to enable adjustment of the scraper plates toward the sides to take up wear upon the outer edges of the said scraper plates.

3. In a scraper vehicle of the class described, in combination, a wheeled body comprising spaced sides, a curved dirt receiving and supporting apron pivotally mounted between said sides and carried thereon, a scraper blade arranged adjacent to the receiving edge portion of the apron and also adjacent to the sides of the body, instrumentalities for raising and lowering the apron by movement between the sides of the body, the side edges of the apron being spaced from the inner surfaces of the sides of the body, scraper plates mounted upon the upper surface of the apron at its side edges and curved to conform with the curvature of the apron so as to lie flat thereon, and adjustable fastening means between the scraper plates and the apron comprising bolts securing the two together, the said plates being provided with transverse slots through which the said bolts pass and which permit the adjustment of the scraper plates outwardly toward the inner surfaces of the sides of the body to enable wear between the plates and the sides to be taken up.

GEORGE A. VAUGHN.